United States Patent [19]
Gois

[11] Patent Number: 5,505,013
[45] Date of Patent: * Apr. 9, 1996

[54] PURSE RING

[76] Inventor: John F. Gois, 4803 La Cruz Dr., La Mesa, Calif. 92041

[*] Notice: The portion of the term of this patent subsequent to Jul. 31, 2012, has been disclaimed.

[21] Appl. No.: 389,598

[22] Filed: Feb. 16, 1995

[51] Int. Cl.[6] .................................................. A01K 73/12
[52] U.S. Cl. .............................................. 43/14; 24/598.3
[58] Field of Search ...................... 43/14, 7, 8; 24/573.5, 24/600.1, 600.2, 598.3, 600.4, 600.9, 601.6, 573.1; D8/382, 367, 356, 360; 254/390, 393, 411, 416

[56] References Cited

U.S. PATENT DOCUMENTS

| | | | |
|---|---|---|---|
| 240,132 | 4/1881 | Howe | 24/573.5 X |
| 1,415,692 | 5/1922 | Pavoni | 24/600.2 |
| 1,473,983 | 11/1923 | White | 294/82.21 |
| 1,508,705 | 9/1924 | Mahan | 294/82.21 |
| 1,636,209 | 7/1927 | Bergsten | 294/82.21 |
| 3,064,384 | 11/1962 | Lewis et al. | 43/14 |
| 3,789,532 | 2/1974 | Ferguson | 43/14 |
| 4,380,882 | 4/1983 | Flammini | 43/14 |
| 4,802,264 | 2/1989 | Isenhart | 24/573.5 |
| 4,805,334 | 2/1989 | Barclay | 43/7 |
| 4,811,467 | 3/1989 | Lowe | 24/573.5 |
| 5,018,295 | 5/1991 | Taylor, IV et al. | 43/14 |
| 5,287,645 | 2/1994 | Gois | 43/14 |

FOREIGN PATENT DOCUMENTS

| | | | |
|---|---|---|---|
| 353870 | 1/1921 | Germany | 254/416 |
| 83217 | 3/1954 | Norway | 43/14 |
| 442778 | 12/1973 | U.S.S.R. | 43/14 |

Primary Examiner—Richard K. Seidel
Assistant Examiner—Jeanne M. Elpel
Attorney, Agent, or Firm—Nydegger & Associates

[57] ABSTRACT

A purse ring for interconnecting a purse seine to a purse line has a frame with a first roller mounted across the frame, creating a purse line passageway. The first roller permits rolling engagement with the purse line as the purse line is retrieved during seiner operations. The frame of the roller is formed with a pivotable cable release arm to permit insertion or withdrawal of the purse line from the purse line passageway. A crossbar can also be attached across the frame which forms a bridle line passageway for connecting the purse ring to a bridle line or some other means of connection to the seine. A second roller can be mounted on the crossbar to permit rolling engagement with the purse line. The frame is formed with a pair of elbows in the frame next to the first roller, creating a widening of the frame around the purse line passageway near the first roller. The frame can also be formed with a second pair of elbows in the frame next to the second roller, creating a widening of the frame around the purse line passageway near the second roller. Further, the frame can be formed with a third pair of elbows in the frame next to the second roller, creating a widening of the bridle line passageway.

17 Claims, 5 Drawing Sheets

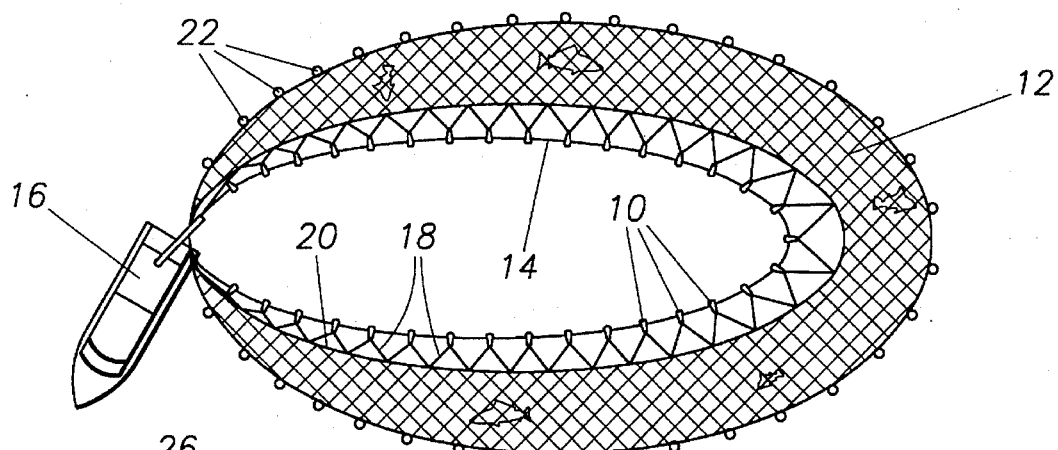
FIG. 1
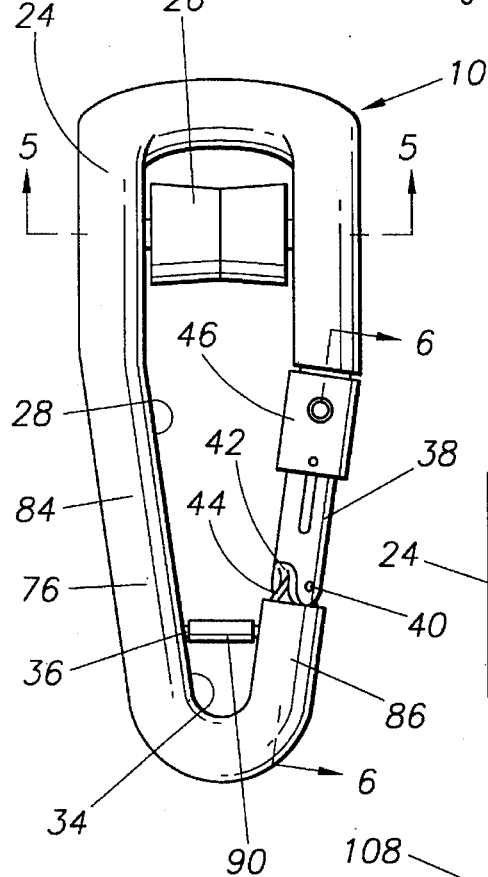
FIG. 2
(PRIOR ART)
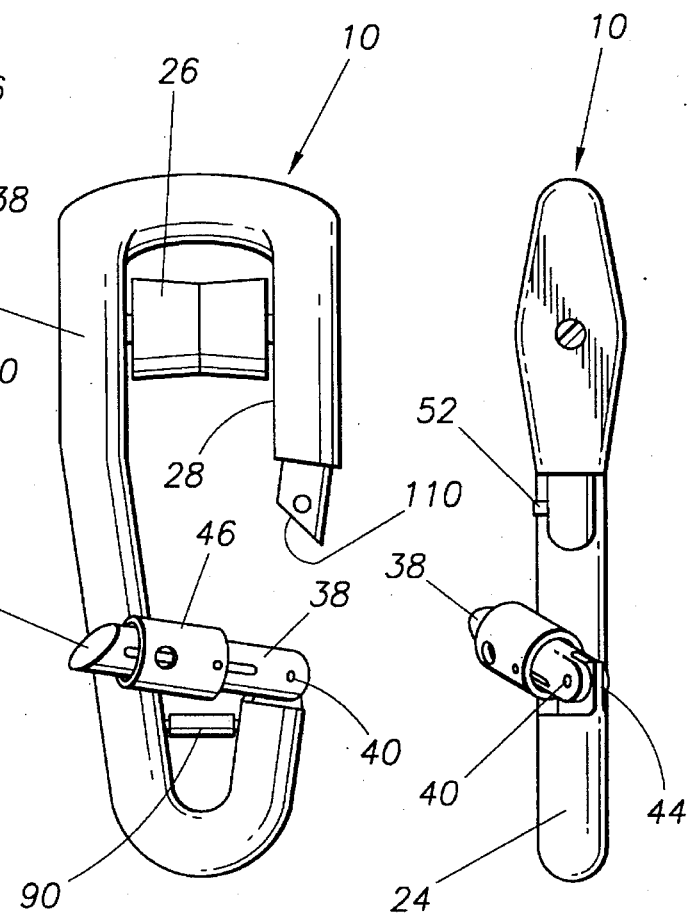
FIG. 3
(PRIOR ART)
FIG. 4
(PRIOR ART)

PURSE RING

FIELD OF THE INVENTION

The present invention pertains to seine equipment used in fishing operations. More specifically, the present invention pertains to purse rings which connect the fishing net to a pursing cable or purse line. The present invention is particularly, but not exclusively, useful in purse seiner operations wherein a purse line is drawn through a plurality of purse rings to close the seine and retrieve fish caught in the seine.

BACKGROUND OF THE INVENTION

In commercial fishing operations, the method of fishing known as purse seine fishing is an effective and widely used technique. The method is conceptually simple. A seine, or net, is fitted at the top end with buoyant devices (e.g. floats) and at the lower end with weighting devices (e.g. sinkers). As the seine is deployed in a rough circle, the weighted end of the seine submerges to cause the seine to hang essentially vertically in the water. To provide for seine retrieval, a purse line is attached to the weighted end of the seine by a plurality of connectors, known as purse rings. As the purse line is tightened by fishermen on the fishing vessel, the weighted end of the seine is drawn together to enclose fish within the seine. The weighted end, now pursed, is raised and drawn toward the fishing vessel. Simultaneously, support craft retrieve and draw in the buoyed end of the seine. In this way, fish are trapped in the seine as it is retrieved.

During seine retrieval, the purse line, through its interaction with the purse rings, is used to both purse the seine and draw it toward the fishing vessel. As can be easily imagined, the forces which are generated between the purse line and the purse ring during these operations can be very substantial. Indeed, these forces can cause significant frictional erosion and wear on both the purse line and the surface of the purse rings. The eventual results are a complete failure of the purse rings and a fraying of the purse line which causes the purse line to snag on the netting. In either event, the operation is compromised and the purse rings and cables may need to be replaced.

Recent developments in the commercial fishing area have compounded the problem of purse ring and cable wear because many of the now preferred fishing grounds are located in the Western Pacific Ocean. It happens that purse seiner operations in the Western Pacific require deeper deployment of the seines than in other ocean areas because the relatively deeper thermoclines in the Western Pacific often result in deeper schooling of food fish. Consequently, with the deployment of large seines, the forces required to retrieve the seines (e.g. forces between the purse line and the purse rings) are greatly increased. As a further consequence, standard purse rings, such as are used in other oceans of the world, are generally inadequate for use in the Western Pacific.

Some purse rings are known which incorporate rollers to reduce the friction between the purse ring and the purse line. One example of a roller purse ring was disclosed in U.S. Pat. No. 5,287,645, issued to the inventor of the present invention.

Known roller purse rings suffer from several problems in actual operation. First, one category of problem is directly related to the shape of the frame in the known purse rings. It is desirable to deploy the seine by first stringing the purse rings on a cylindrical metal bar or pipe and then rolling the purse rings sequentially off of the bar as the seine is deployed. This helps eliminate tangling of the seine during deployment. The metal bar is strung through the central passageway in the purse ring frame, through which the purse line passes. The weight of the purse ring and attached equipment is borne by the purse line roller rolling along the cylindrical metal bar.

With known roller purse rings, the oblong frame of the purse ring has relatively straight frame members on the sides between the two ends, with the purse ring roller being near one end, and with the bridle line roller, when present, near the opposite end. The relatively straight side members are sometimes tapered inwardly toward each other, from the width of the purse line roller toward the width of the bridle line roller. The width of the larger end of the central passageway on known purse rings, therefore, is essentially the same width as the purse line roller. The size of the roller and the thickness of the frame are substantially dictated by the weight to be carried by the purse ring and the size of the purse line.

Therefore, in known purse rings, the width of the purse line passageway for a purse ring having a given width of roller is so narrow that the maximum size of cylindrical metal rod that can be strung through the purse ring is too small to be practical. In other words, when using the largest diameter metal rod which can fit through the central passageway in a given size of purse ring, the weight of a typical purse seine with all of its purse rings and sinkers is too great for the metal bar to bear. This results in undesirable bending of the metal bar, impairing the deployment of the seine.

In another aspect, the typical shape of the frame of a known purse ring often results in a problem with the time required for the purse line to center on the roller, when the purse line is winched in to the boat. Purse line rollers are typically double tapered rollers, forming a shallow vee where the purse line is supposed to center for most efficient rolling. The problem arises because known purse ring frames are shaped so as to require the use of a wider than necessary roller, with shallower taper angles, which results in more time being required for the purse line to center on the roller, ultimately resulting in increased drag on the purse line.

A second problem which can occur is related indirectly to the shape of the frame of the purse ring. The problem is that in known roller purse rings, the seine material can become wedged or snagged in crevices between the purse ring frame and the ends of the bridle line roller. This problem also results indirectly from the fact that known purse rings have relatively straight frame members running along the sides of the frame. In known two roller purse rings, the straight side members of the frame angle toward each other from the width of the purse line roller toward the bridle line roller, which is usually narrower. This results in the formation of a crevice at each end of the bridle line roller, in which the seine material can become wedged.

A third problem with known roller purse rings is that the bridle line passageway is often so narrow as to restrict the free movement of the bridle line to some degree, resulting in increased wear on the relatively soft bridle lines. Here again, this problem results indirectly from the shape of the frame, in that the straight sides of the known roller purse ring frames are angled together, producing a relatively narrow bridle line passageway, almost in the shape of a vee, which restricts lateral movement of the bridle line unnecessarily.

Finally, a fourth problem with known roller purse rings is that the size of the cable release opening created by releasing of the cable release arm is limited by the beveled projection of a portion of the frame into the cable release opening. This beveled projection is designed to match up with the beveled end of the pivoting member of the cable release arm. The angle of this bevel on known purse rings is typically less than sixty degrees from the axis of the cable release arm, creating a fairly pronounced projection into the cable release opening. This results in a significant reduction in the available size of the opening for inserting or withdrawing the purse line. Such a steep angle on the bevel was thought to be necessary to maintain alignment of the cable release arm with the frame, under stress applied by the purse line on the inside of the cable release arm. This reduction of the size of the cable release opening is particularly important in smaller purse rings.

In light of the foregoing, the present invention recognizes the need to provide a larger central passageway through the purse ring frame, to allow the stringing of a given size of purse ring on a larger diameter metal bar than previously possible. A further object of the present invention is to eliminate crevices between the frame and the ends of the bridle line roller, to prevent seine material from becoming wedged in the crevices. A still further object of the present invention is to provide a wider bridle line passageway on any given size of purse ring, to allow a larger size bridle line to be used. A yet further object of the present invention is to increase the size of the available cable release opening on any given size of purse ring. Another object of the present invention is to provide a purse ring for purse seiner fishing operations which is easy to install and use, relatively easy to manufacture, and comparatively cost-effective.

SUMMARY OF THE INVENTION

A preferred embodiment of the improved purse ring of the present invention includes an improved oblong-shaped frame which has been modified to be more compact than known frames. As envisioned in the present invention, a roller is mounted across the frame near one end of the frame to form a surface for rolling engagement with a purse line or cable during purse seine operations. Stated differently, to minimize frictional wear between the purse line and purse ring, the purse ring incorporates a roller which extends across the frame to establish a rolling engagement between the purse ring and the purse line as the purse line passes through the purse ring frame. Additionally, a crossbar is fixedly attached across the frame near the end of the oblong frame opposite from the roller to form a central purse line passageway of a portion of the aperture formed by the frame. This also forms a bridle line passageway of a portion of the aperture formed by the frame. As so attached, the crossbar is used for engaging the purse line and protecting the bridle line which connects the purse ring to the seine. The cross bar can incorporate a roller similar to the roller disclosed above. With this embodiment, the frame effectively has parallel rollers which are mounted across the frame to reduce the frictional forces which are typically generated between the purse line and the purse ring.

The frame may be formed with a cable release arm on its periphery which is pivotable between opened and closed positions to permit insertion or withdrawal of the purse line from the purse ring. Further, the cable release arm may be canted at its pivot point with respect to the frame, to permit the cable release arm to pivot out of the plane of the frame and to fully open the access to the ring to facilitate the insertion and withdrawal of the purse line from the purse ring. If desired, the frame of the purse ring may still include the roller, but need not include the pivotable cable release arm.

In order to permit the stringing of the purse ring on a metal bar strong enough to carry the weight imposed by a typical purse seine, the frame of the purse ring is formed with a widened central passageway. The widened passageway is formed by introducing a first pair of outwardly projecting elbows into the frame adjacent the purse line roller, rather than forming the sides of the frame as straight members. This allows a given size of purse ring to be strung on a metal bar of larger diameter than would be possible with a purse ring with straight sides. Stated another way, given the use of a central passageway having the desired width to accommodate the necessary diameter of the metal bar, the elbows in the frame narrow the frame down adjacent the purse line roller to allow the use of a narrower roller than would be possible with a purse ring with straight sides. This saves manufacturing cost and weight by allowing the use of a narrower roller. The first pair of elbows can be positioned immediately contiguous to the ends of the purse line roller, with the result that the purse line is guided quickly onto the roller, causing rapid centering of the purse line on the roller.

A second pair of outwardly projecting elbows can be formed into the sides of the frame around the central passageway, next to the bridle line roller. This completes the widening of the central passageway while allowing the use of a relatively narrow bridle line roller, thereby saving manufacturing cost and weight. The first and second pairs of elbows also result in an overall shorter purse ring, meaning less material is used in the frame, thereby reducing the weight of the purse ring, and reducing the chance of bending.

A third pair of outwardly projecting elbows can be formed into the sides of the frame around the bridle line passageway. This provides a widened bridle line passageway, allowing a larger size of the bridle line. The second and third pairs of elbows can be positioned immediately contiguous to the ends of the bridle line roller to eliminate any excessive clearances between the ends of the roller and the frame. This reduces the possibility that the seine material will become wedged in such crevices, thereby reducing wear on the seine.

Since one result of the implementation of the present invention is that the overall frame size of a purse ring designed for a given service will be smaller than is known in previous purse rings, it is helpful to increase the available size of the cable release opening. This is accomplished by changing the angle of the bevel on the free end of the cable release arm to a larger angle, as measured from the axis of the cable release arm. This angle can be increased to the range of between seventy-five and eighty-five degrees, with an optimum angle being approximately eighty degrees. This means that the projection of the frame end into the cable release opening is substantially reduced.

The novel features of this invention, as well as the invention itself, both as to its structure and its operation, will be best understood from the accompanying drawings, taken in conjunction with the accompanying description, in which similar reference characters refer to similar parts, and in which:

BRIEF DESCRIPTION OF THE DRAWINGS

FIG. 1 is a top view of a fishing vessel engaged in purse seiner operations;

FIG. 2 is a front elevation view of the prior art purse ring with straight sides, showing the cable release arm in its closed position;

FIG. 3 is a front elevation view of the prior art purse ring shown in FIG. 2, showing the cable release arm in its open position;

FIG. 4 is a side elevation view of the prior art purse ring shown in FIG. 3;

DETAILED DESCRIPTION OF THE PREFERRED EMBODIMENT

Figure 5:
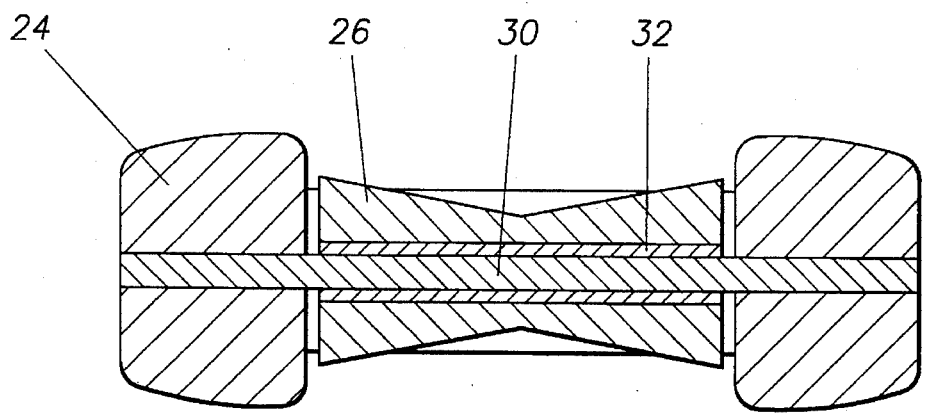
FIG. 5 is a cross-sectional view of the mounting of the purse line roller in the prior art purse ring as seen along the line 5—5 in FIG. 2.

FIG. 1 shows a top overhead view of a purse seiner in operation using a plurality of purse rings designated 10. As shown, the purse rings 10 interconnect seine 12 and pursing cable, or purse line, 14 during the fishing operations conducted by seiner vessel 16. More specifically, purse rings 10 are attached to seine 12 with bridle lines 18 which are, in turn, attached to seine 12 at chain 20. Bridle lines 18 may be cables, ropes or chains. Floats 22 provide buoyancy to maintain one side of seine 12 at or near the water's surface, while chain 20 and purse rings 10 act as sinkers to vertically orient seine 12. Seine 12 is thus positioned to encircle the school of fish. Catching the fish requires pursing and retrieving the seine 12. This requires the interaction of purse line 14 with the plurality of purse rings 10.

FIGS. 2 through 7 show a more detailed view of an individual purse ring 10 as is known in the prior art. As shown in FIG. 2, purse ring 10 comprises a frame 24 which is, typically, substantially oblong in shape, enclosing an aperture. Purse ring 10 is preferably made of steel; however, any material may be used which is strong enough to withstand the forces on purse rings that are inherent in seiner operations. The material of purse ring 10 and its individual components, discussed in detail below, should also be hard enough to resist frictional wear such as is caused when purse line 14 is drawn through purse ring 10, against members of frame 24. Further, the elements of purse ring 10 should be chemically compatible with each other and with the materials of other components of seiner operations so as to minimize the effects of corrosion.

It can be seen that frame 24 supports a roller 26 which is positioned across frame 24 to partition off a portion of the enclosed aperture to form a central passageway, or purse line passageway 28. The roller 26 is substantially cylindrical, but as shown, roller 26 is double tapered toward its center to form a guide which facilitates a more efficient rolling contact of the roller 26 with purse line 14. Further, roller 26 should be connected to frame 24 so as to provide for substantially free rotation and consequent reduced frictional wear on roller 26 when purse line 14 is drawn through passage 28 and against roller 26. The sides 84, 86 of the frame 24 are substantially straight, and they taper inwardly from the width of the roller 26 toward the roller 90.

It can be seen that the connection between purse ring 10 and bridle line 18 is provided for by a bridle line passageway 34 which is formed by positioning a crossbar 36 on frame 24 substantially as shown. This crossbar 36 extends across frame 24 and is fixedly attached to frame 24 by any means well known in the art, such as by being integrally molded to frame 24. A roller 90 can be incorporated with the crossbar 36 for the purpose of further reducing the frictional forces which can exist between the purse ring 10 and the purse line 14. As can be seen, the inward taper of the straight sides of the frame 24 past the ends of the roller 90 results in the creation of significant clearances near the ends of the roller 90, in which seine material can become snagged.

FIG. 2 also illustrates a pivoting cable release arm 38 in its first position, the fully closed position, while FIG. 3 illustrates this same pivoting arm 38 in its second, or open, position. Although purse ring 10 may be constructed without pivoting arm 38, purse ring 10 can incorporate a pivoting arm 38 which is movable between an opened position (FIG. 3) and a closed position (FIG. 2) to facilitate the engagement and disengagement of purse line 14 with purse ring 10. A pivot pin 40 is shown extending through a slot 42 that is formed in pivoting arm 38. As shown, pivot pin 40 also extends through an extension 44 of frame 24 to provide for pivotal movement of pivoting arm 38 about the pivot pin 40.

Referring now to FIG. 5, it can be seen that purse ring 10 preferably uses a bushing-shaft arrangement to provide for the rollable connection between roller 26 and frame 24. A shaft 30 is fixedly attached to frame 24 and can even be integrally formed on frame 24. It will be appreciated by the skilled artisan that in the alternative, shaft 30 may be releasably mounted to frame 24 by any means well known in the art. A bushing 32 supports the roller 26 and surrounds shaft 30 to provide for the rolling action of roller 26. Bushing 32 should be constructed of a material which is of sufficient hardness to effectively withstand frictional erosion caused by relative motion between bushing 32 and shaft 30. In the preferred embodiment, bushing 32 is made of brass. In all important respects the roller 90 is mounted on frame 24 in a manner similar to that disclosed above for the roller 26.

Figure 6:
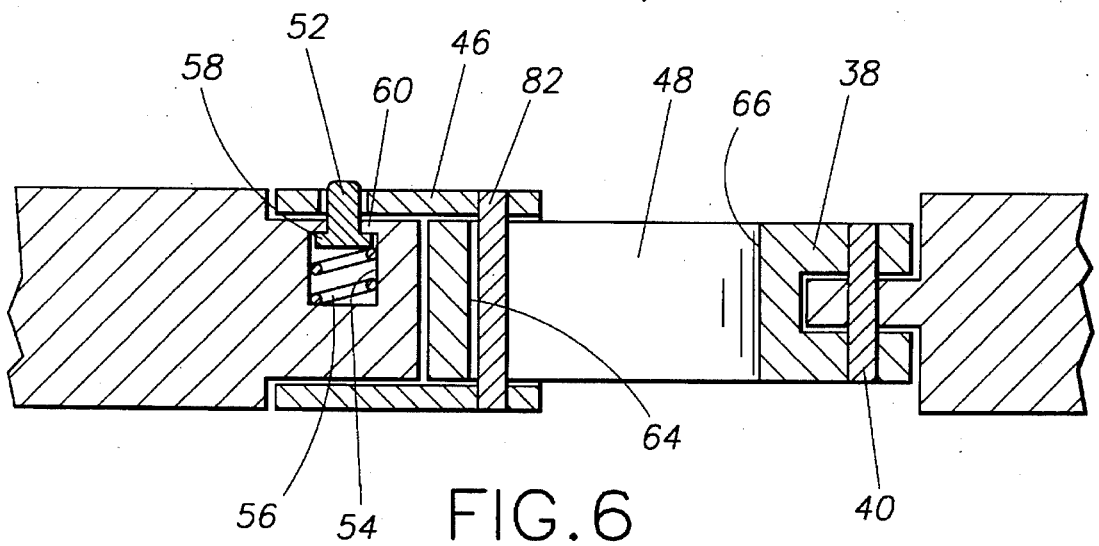
FIG. 6 is a cross-sectional view of the cable release arm of the prior art purse ring in its closed and latched position as seen along the line 6—6 in FIG. 2.
Figure 7:
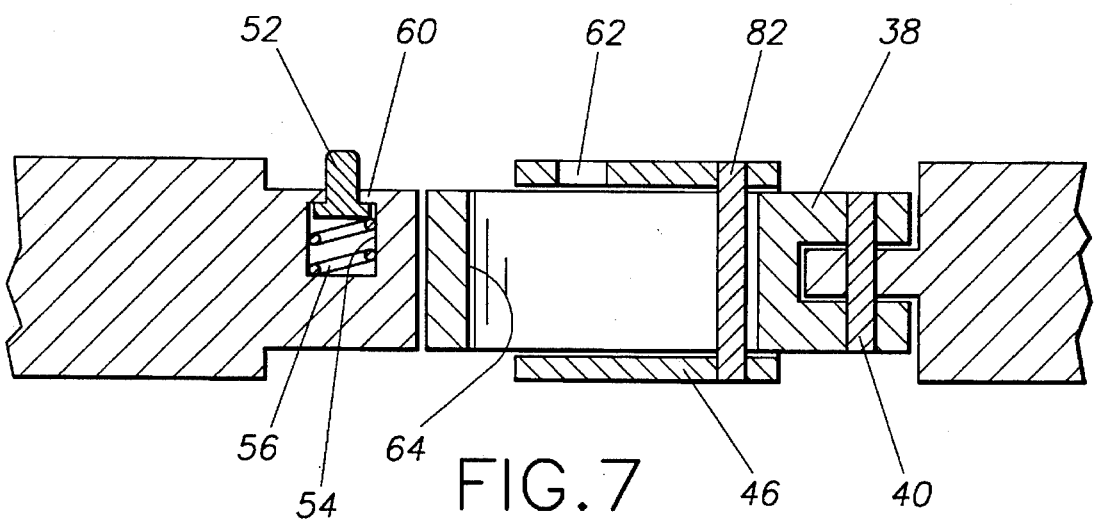
FIG. 7 is a cross-sectional view of the cable release arm as seen in FIG. 6 with the sleeve of the cable release arm in its retracted position.

As seen in FIGS. 6 and 7, a sleeve 46 is slidably mounted on the pivoting cable release arm 38 and is movable between a first position (shown in FIG. 6) wherein pivoting arm 38 is held stationary relative to frame 24 to hold purse line 14 in purse line passageway 28, and a second position (shown in FIG. 7) wherein pivoting arm 38 may be pivoted or rotated to open the cable release opening and allow purse line 14 to be placed into or removed from purse line passageway 28. As also shown by FIG. 6, pivoting arm 38 is formed with a guide slot 48 which slidably receives a guide pin 82 that is integrally connected to sleeve 46.

In order to hold sleeve 46 in its first, or locked, position (FIG. 6) the sleeve 46 is formed with an opening 62 which slidably receives pin 52 that is mounted on frame 24 and urged into the opening 62 of sleeve 46. Specifically, pin 52 is seated in slot 54 of frame 24 and in contact with a spring 56 that is also housed in slot 54. As will be easily appreciated, the action of spring 56 tends to push pin 52 out of the slot 54. Pin 52, however, is formed with a lip 58 which is urged against abutment 60 by the action of spring 56 against pin 52. Thus, pin 52 is confined to reciprocal movement within slot 54. As will be appreciated by the skilled artisan, pin 52 can be depressed, against the action of spring 56, to position the pin 52 completely within the slot 54. This removes pin 52 from the opening 62 in sleeve 46 and permits the sliding of sleeve 46 along pivoting arm 38.

Sleeve 46 is a substantially hollow cylinder that surrounds pivoting arm 38 and frame 24 and is slidably mounted on pivoting arm 38. As stated above, any slidable movement of sleeve 46 on pivoting arm 38 is prevented when pin 52 is in its extended position, and is received within the opening 62 of sleeve 46, as shown in FIG. 6. On the other hand, when pin 52 is depressed into the slot 54 of frame 24, sleeve 46 is movable on pivoting arm 38 and frame 24, to its position shown in FIG. 7. The slidable movement between these positions is constrained by the limits imposed on guide pin 82 by stops 64 and 66 of guide slot 48. When in the configuration shown in FIG. 7, pivoting arm 38 is in its closed position with sleeve 46 disengaged. This, of course, is possible only after pin 52 has been depressed, using the thumb of the operator or any suitable tool that fits into opening 62 to depress pin 52, to disengage sleeve 46 from frame 24 for slidable movement on pivoting arm 38. As shown in FIG. 7, sleeve 46 is unlocked and has been permitted to slide on pivoting arm 38 until guide pin 82 is in contact with stop 66 of guide slot 48. Sleeve 46 is thus cleared of frame 24, and pivoting arm 38 can be pivoted about pivot pin 40 to open the cable release opening in frame 24.

The purse ring shown has a canted pivoting cable release arm 38. Pivoting arm 38 is able to clear the continuous side 76 of frame 24 and pivot inwardly toward cross bar 36 until pivoting arm 38 is substantially parallel to the cross bar 36, as shown in FIG. 3. As indicated above and, as best seen in FIG. 4, extension 44 of frame 24 is canted with respect to frame 24 to permit pivoting arm 38 to clear continuous side 76 of frame 24. It will be appreciated that when pivoting arm 38 is pivoted to the open position shown in FIGS. 3 and 4, it thereby establishes a cable release opening in frame 24 to facilitate insertion or withdrawal of purse line 14 from purse ring 10. As seen in FIG. 3, the free end 106 of the pivoting arm 38 is designed to mate with a free end 108 on the frame 24. The free ends 106, 108 are formed with a bevel, at an angle of approximately 60 degrees, measured from the longitudinal axis of the cable release arm 38.

Figure 8:
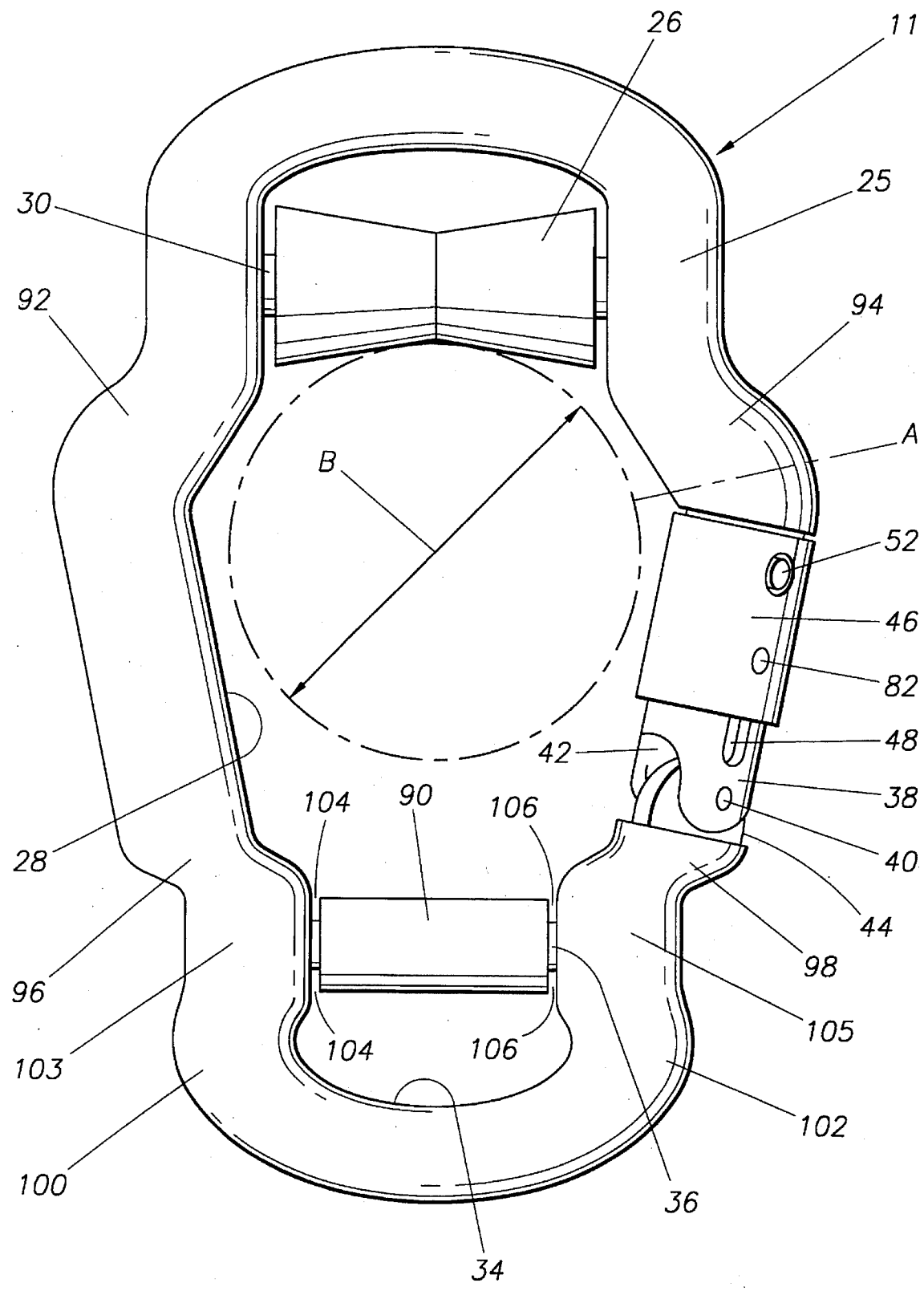
FIG. 8 is a front elevation view of a preferred embodiment of the improved purse ring of the present invention, with the cable release arm in its closed position.
Figure 9:
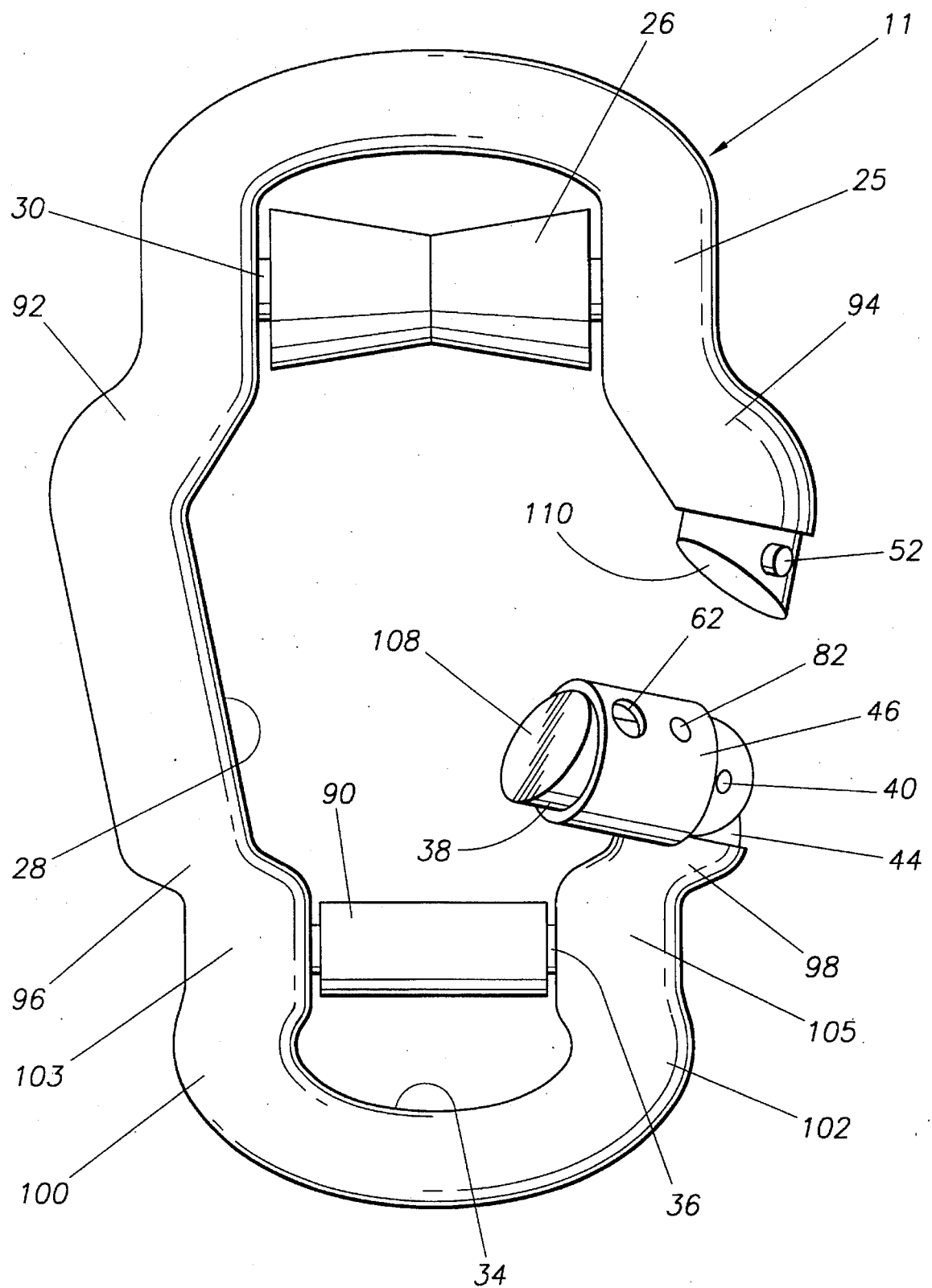
FIG. 9 is a front elevation view of the improved purse ring shown in FIG. 8, with the cable release arm in its open position.

FIGS. 8 and 9 show the preferred embodiment of the improved purse ring 11 of the present invention. The frame 25 of the improved purse ring 11 is generally more compact than the prior art purse ring, for a given central passageway size. FIG. 8 shows in dashed lines the outline of a metal bar A having a given diameter B, with the metal bar A being sized, for discussion purposes, to support a given number of purse rings 11 and related other equipment and seine material. It can be seen that the frame 25 of the improved purse ring 11 is shaped with a widened central passageway 28 to accommodate the metal bar A having the requisite diameter B. It can also be seen that if the sides of the frame 25 were formed straight as was known in the prior art, rather than widened, the central passageway 28 would not have been large enough to accommodate the metal bar A having the requisite diameter B.

More specifically, the frame 25 is widened in the area of the central passageway 28 by the inclusion of a pair of outwardly projecting elbows 92, 94 in the frame 25 adjacent to the ends of the purse line roller 26. The elbows 92, 94 lie essentially in the plane of the frame 25. In the embodiment shown, the first pair of elbows 92, 94 are formed immediately contiguous to the ends of the roller 26, but they could be formed slightly removed from the roller 26. The elbows 92, 94 are formed as double bends which offset the sides of the frame 25 outwardly from the center of the central passageway 28, allowing the stringing of the improved purse ring 11 on the metal bar A having a diameter B. The lower ends of the sides of the frame 25 taper back toward the bridle line roller 90.

Farther down the sides of the frame 25, a second pair of outwardly projecting elbows 96, 98 are formed in the frame 25 to widen the lower end of the central passageway 28, adjacent to the bridle line roller 90. Finally, a third pair of outwardly projecting elbows 100, 102 are formed in the sides of the frame 25, adjacent to the bridle line roller 90, resulting in the widening of the bridle line passageway 34. The second and third pairs of elbows 96, 98, 100, 102 are shown formed immediately contiguous to the ends of the bridle line roller 90, although they could be slightly removed from the roller 90. Formation of the second and third pairs of elbows essentially in the plane of the frame 25 results in the provision of parallel frame members 103, 105 near the ends of the roller 90, eliminating any excessive clearances at points 104 and 106 next to the roller 90 which could otherwise snag the seine material.

FIG. 9 also shows the free ends 108, 110 of the pivoting arm 38 and the frame 25, respectively, which are beveled at an angle of approximately eighty degrees, measured from the axis of the pivoting arm 38. This increases the size of the cable release opening available for inserting or removing the purse line 14 from the purse line passageway 28. Any angle between approximately seventy-five and eighty-five degrees will substantially increase the size of this opening beyond the sizes previously known.

Figure 10:
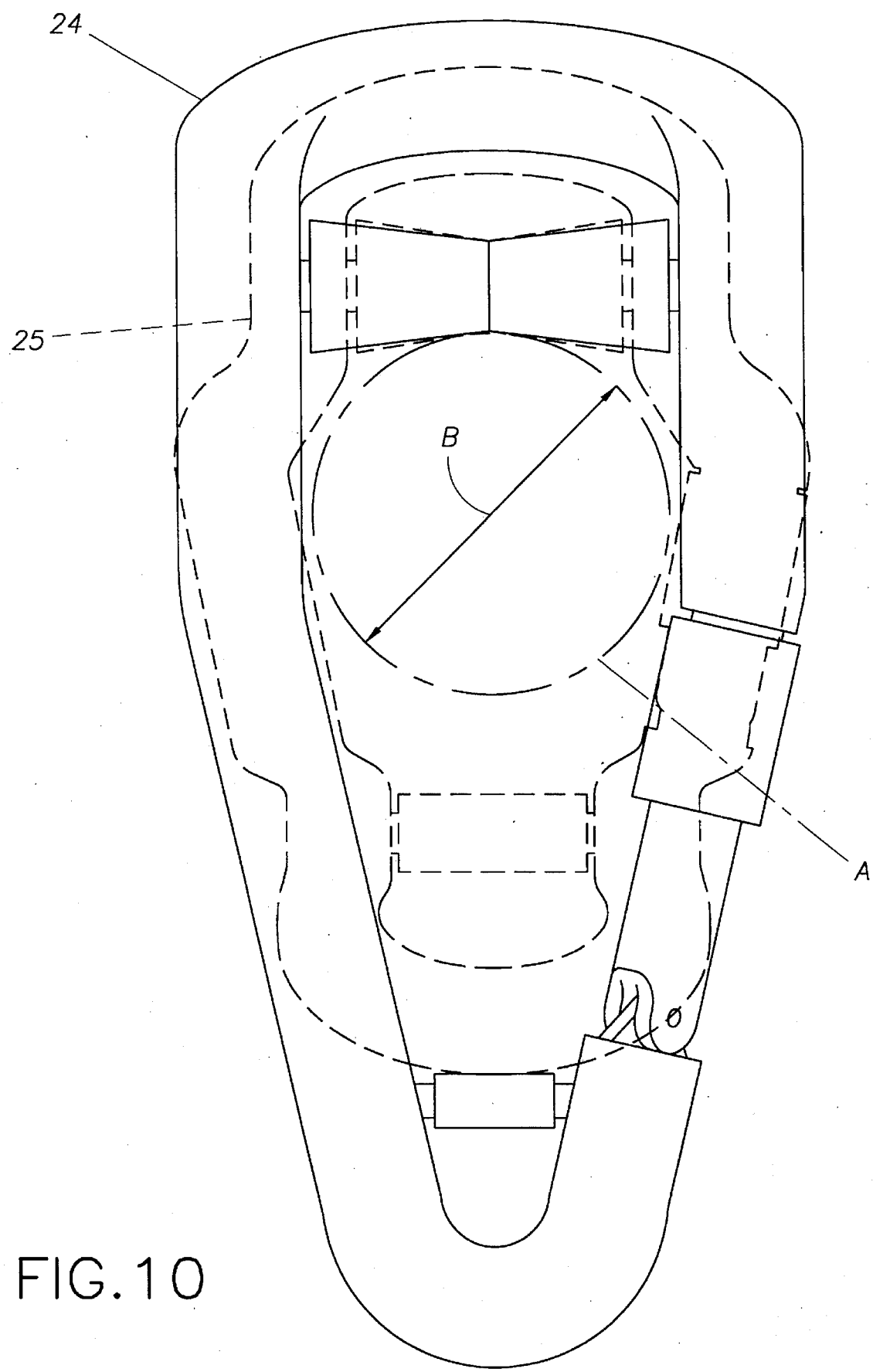
FIG. 10 is a front elevation view of a prior art purse ring showing an overall size comparison with an equivalent improved purse ring of the present invention.

Finally, FIG. 10 illustrates one of the advantages of the improvements made in the frame 25 of purse ring of the present invention. A purse ring 10 as known in the prior art is shown, with its frame 24 shown as a solid line. A purse ring 11 according to the present invention is superimposed, with its frame 25 shown as a dotted line. Also shown is the metal bar A with diameter B. It can be easily seen that, for a given size of metal bar A, designed for a given weight load, the old design of purse ring frame 24 must be significantly larger than the improved design of purse ring frame 25. Therefore, for a given service, the old design of purse ring 10 will require much more material than the improved design 11, and the old design will consequently add more to the weight load.

While the particular improved purse ring as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A purse ring engageable with the bridle line of a seine for pursing the seine with a purse line during deep-sea fishing operations, said purse ring comprising:

an oblong-shaped frame having an aperture therethrough, said frame defining a plane;

a roller mounted across said frame to bridge said aperture, said roller and portions of said frame defining a periphery around a purse line passageway of said aperture for receiving said purse line therethrough, said purse line being engageable with said roller to reduce friction therebetween during deployment and retrieval of said seine;

a pair of outwardly projecting elbows formed in portions of said frame defining said purse line passageway, with one said elbow of said pair being adjacent each end of said roller, said pair of elbows lying in said plane of said frame and combining to create a widening of said frame around said purse line passageway adjacent to said roller;

a cable release arm pivotally mounted as a portion of said frame to partially define said periphery, said cable release arm being pivotable out of said plane to interrupt said periphery for insertion and removal of said purse line relative to said purse line passageway; and a sleeve slidably attached to said cable release arm for engagement and disengagement with said frame, said sleeve having an extended and a retracted position, said sleeve engaging said frame and preventing movement of said cable release arm out of said plane when in said extended position.

2. A purse ring as claimed in claim 1, wherein said pair of elbows are formed in said frame immediately contiguous to said ends of said roller to guide said purse line onto said roller.

3. A purse ring as claimed in claim 1, further comprising:

a first bevel formed on a free end of said cable release arm, where said free end of said cable release arm engages said frame; and a second bevel formed on a free end of said frame, where said free end of said frame engages said free end of said cable release arm, said second bevel substantially matching said first bevel to align said cable release arm with said frame;

wherein said first bevel and said second bevel are formed at an angle of between seventy-five degrees and eighty-five degrees from the axis of said cable release arm.

4. A purse ring as claimed in claim 3, wherein said first bevel and said second bevel are formed at an angle of approximately eighty degrees from said axis of said cable release arm.

5. A purse ring as claimed in claim 1, further comprising:

a bar mounted across said frame to bridge said aperture and to create a bridle line passageway of said aperture for receiving said bridle line therethrough, wherein said roller and said bar are substantially parallel, with said roller, said bar and said frame defining said periphery around said purse line passageway, and with said bar and said frame defining a second periphery around said bridle line passageway, said purse line being engageable with said bar to protect said bridle line; and a second pair of outwardly projecting elbows formed in portions of said frame defining said purse line passageway, with one said elbow of said second pair being adjacent each end of said bar, said second pair of elbows lying in said plane of said frame and combining to create a second widening of said frame around said purse line passageway adjacent to said bar.

6. A purse ring as claimed in claim 5, further comprising:

a second roller mounted on said bar, said purse line being engageable with said second roller to protect said bridle line; and a third pair of outwardly projecting elbows formed in portions of said frame defining said bridle line passageway, with one said elbow of said third pair being adjacent each end of said second roller, said third pair of elbows lying in said plane of said frame and combining to create a third widening of said frame around said bridle line passageway adjacent to said second roller.

7. A purse ring as claimed in claim 6, wherein said second and third pairs of elbows are formed in said frame immediately contiguous to said ends of said second roller to prevent said seine from wedging between said second roller and said frame.

8. A purse ring engageable with the bridle line of a seine for pursing the seine with a purse line during deep-sea fishing operations, said purse ring comprising:

an oblong-shaped frame having an aperture therethrough, said frame defining a plane;

a roller mounted across said frame to bridge said aperture, said purse line being engageable with said roller to reduce friction therebetween during deployment and retrieval of said seine;

a bar mounted across said frame to bridge said aperture and to create a purse line passageway of said aperture for receiving said purse line therethrough, and to create a bridle line passageway of said aperture for receiving said bridle line therethrough, wherein said roller and said bar are substantially parallel, with said roller, said bar and said frame defining a first periphery around said purse line passageway, and with said bar and said frame defining a second periphery around said bridle line passageway, said purse line being engageable with said bar to protect said bridle line;

a first pair of outwardly projecting elbows formed in portions of said frame defining said purse line passageway, with one said elbow of said first pair being adjacent each end of said roller, said first pair of elbows lying in said plane of said frame and combining to create a first widening of said frame around said purse line passageway adjacent to said roller;

a second pair of outwardly projecting elbows formed in portions of said frame defining said purse line passageway, with one said elbow of said second pair being adjacent each end of said bar, said second pair of elbows lying in said plane of said frame and combining to create a second widening of said frame around said purse line passageway adjacent to said bar;

a cable release arm pivotally mounted as a portion of said frame to partially define said first periphery, said cable release arm being pivotable out of said plane to interrupt said first periphery for insertion and removal of said purse line relative to said purse line passageway; and a sleeve slidably attached to said cable release arm for engagement and disengagement with said frame, said sleeve having an extended and a retracted position, said sleeve engaging said frame and preventing movement of said cable release arm out of said plane when in said extended position.

9. A purse ring as claimed in claim 8, wherein said first pair of elbows are formed in said frame immediately contiguous to said ends of said roller to guide said purse line onto said roller.

10. A purse ring as claimed in claim 8, further comprising:

a first bevel formed on a free end of said cable release arm, where said free end of said cable release arm engages said frame; and a second bevel formed on a free end of said frame, where said free end of said frame engages said free end of said cable release arm, said second bevel substantially matching said first bevel to align said cable release arm with said frame;

wherein said first bevel and said second bevel are formed at an angle of between seventy-five degrees and eighty-five degrees from the axis of said cable release arm.

11. A purse ring as claimed in claim 10, wherein said first bevel and said second bevel are formed at an angle of approximately eighty degrees from said axis of said cable release arm.

12. A purse ring as claimed in claim 8, further comprising:

a lateral opening in said sleeve;

a slot defined by said frame;

a pin slidingly received by said slot, said pin being extendable from said slot; and a spring in said slot, said spring urging said pin to extend from said slot to engage said opening in said sleeve to prevent movement of said sleeve from said extended position to said retracted position, for maintaining said sleeve in engagement with said frame.

13. A purse ring as claimed in claim 8, further comprising:

a second roller mounted on said bar, said purse line being engageable with said second roller to protect said bridle line; and a third pair of outwardly projecting elbows formed in portions of said frame defining said bridle line passageway, with one said elbow of said third pair being adjacent each end of said second roller, said third pair of elbows lying in said plane of said frame and combining to create a third widening of said frame around said bridle line passageway adjacent to said second roller.

14. A purse ring as claimed in claim 13, wherein said second and third pairs of elbows are formed in said frame immediately contiguous to said ends of said second roller to prevent said seine from wedging between said second roller and said frame.

15. A purse ring engageable with the bridle line of a seine for pursing the seine with a purse line during deep-sea fishing operations, said purse ring comprising:

an oblong-shaped frame having an aperture therethrough, said frame defining a plane;

a first roller mounted across said frame to bridge said aperture, said purse line being engageable with said first roller to reduce friction therebetween during deployment and retrieval of said seine;

a second roller mounted across said frame to bridge said aperture and to create a purse line passageway of said aperture for receiving said purse line therethrough, and to create a bridle line passageway of said aperture for receiving said bridle line therethrough, wherein said roller and said bar are substantially parallel, with said first roller, said second roller, and said frame defining a first periphery around said purse line passageway, and with said second roller and said frame defining a second periphery around said bridle line passageway, said purse line being engageable with said second roller to protect said bridle line;

a first pair of outwardly projecting elbows formed in portions of said frame defining said purse line passageway, with one said elbow of said first pair being immediately contiguous to each end of said first roller, said first pair of elbows lying in said plane of said frame and combining to create a first widening of said frame around said purse line passageway adjacent to said first roller;

a second pair of outwardly projecting elbows formed in portions of said frame defining said purse line passageway, with one said elbow of said second pair being immediately contiguous to each end of said second roller, said second pair of elbows lying in said plane of said frame and combining to create a second widening of said frame around said purse line passageway adjacent to said second roller;

a third pair of outwardly projecting elbows formed in portions of said frame defining said bridle line passageway, with one said elbow of said third pair being immediately contiguous to each end of said second roller, said third pair of elbows lying in said plane of said frame and combining to create a third widening of said frame around said bridle line passageway adjacent to said second roller;

a cable release arm pivotally mounted as a portion of said frame to partially define said first periphery, said cable release arm being pivotable out of said plane to interrupt said first periphery for insertion and removal of said purse line relative to said purse line passageway, said cable release arm comprising a pivot pin attached to said frame on said first periphery, and a pivot member with a first end and a second end, said first end being pivotably attached to said pivot pin for movement of said pivot member out of said plane;

a sleeve slidably attached to said pivot member for engagement and disengagement with said frame, said sleeve having an extended and a retracted position, said sleeve engaging said frame and preventing movement of said pivot member out of said plane when in said extended position, said sleeve being formed with a lateral opening;

a slot defined by said frame;

a latch pin slidingly received by said slot, said latch pin being extendable from said slot; and a spring in said slot, said spring urging said latch pin to extend from said slot to engage said opening in said sleeve to prevent movement of said sleeve from said extended position to said retracted position, for maintaining said sleeve in engagement with said frame.

16. A purse ring as claimed in claim 15, further comprising:

a first bevel formed on said second end of said pivot member, where said second end of said pivot member engages said frame; and a second bevel formed on a free end of said frame, where said free end of said frame engages said second end of said pivot member, said second bevel substantially matching said first bevel to align said cable release arm with said frame;

wherein said first bevel and said second bevel are formed at an angle of between seventy-five degrees and eighty-five degrees from the axis of said cable release arm.

17. A purse ring as claimed in claim 16, wherein said first bevel and said second bevel are formed at an angle of approximately eighty degrees from said axis of said cable release arm.

* * * * *